US011106829B2

(12) United States Patent
Chen (10) Patent No.: US 11,106,829 B2
(45) Date of Patent: Aug. 31, 2021

(54) CHIP FINGERPRINT MANAGEMENT BASED UPON ONE-TIME PROGRAMMABLE MEMORY

(71) Applicant: INNOGRIT TECHNOLOGIES CO., LTD., Shanghai (CN)

(72) Inventor: Moyang Chen, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 405 days.

(21) Appl. No.: 16/213,070

(22) Filed: Dec. 7, 2018

(65) Prior Publication Data

US 2019/0347446 A1 Nov. 14, 2019

(30) Foreign Application Priority Data

May 14, 2018 (CN) .......................... 201810456424.7

(51) Int. Cl.
*G06F 21/73* (2013.01)
*G06F 21/76* (2013.01)

(52) U.S. Cl.
CPC .............. *G06F 21/73* (2013.01); *G06F 21/76* (2013.01)

(58) Field of Classification Search
CPC .................................. G06F 21/76; G06F 21/73
See application file for complete search history.

(56) References Cited

U.S. PATENT DOCUMENTS

| | | | | |
|---|---|---|---|---|
| 4,787,060 A * | 11/1988 | Boudreau | ............. | G06F 11/006 711/115 |
| 5,099,484 A * | 3/1992 | Smelser | ............... | G06F 11/1016 714/761 |
| 5,337,357 A | 8/1994 | Chou et al. | | |
| 5,343,434 A * | 8/1994 | Noguchi | ................. | G11C 29/50 365/185.04 |
| 5,511,164 A * | 4/1996 | Brunmeier | ............ | G06F 11/073 714/15 |
| 5,550,849 A * | 8/1996 | Harrington | ......... | G06F 11/1028 714/752 |
| 6,167,482 A * | 12/2000 | Schmidt | .................... | G06F 9/24 365/185.33 |
| 7,221,961 B1 * | 5/2007 | Fukumoto | ............. | G06F 1/1616 455/41.2 |

(Continued)

FOREIGN PATENT DOCUMENTS

| | | |
|---|---|---|
| CN | 101026455 A | 8/2007 |
| CN | 101419652 A | 4/2009 |

(Continued)

OTHER PUBLICATIONS

NPL Search (Google Scholar) (Year: 2012).*
NPL Search (Google Scholar) (Year: 2021).*

*Primary Examiner* — Mahfuzur Rahman
*Assistant Examiner* — Richard W Cruz-Franqui
(74) *Attorney, Agent, or Firm* — Womble Bond Dickinson (US) LLP (57) ABSTRACT

A chip fingerprint management device includes: a one-time programmable (OTP) memory including a first storage region, the first storage region being readable by hardware and access restricted by software; and an OTP controller which generates a chip fingerprint based on a random number, and programs the generated chip fingerprint into the first storage region in the OTP memory.

13 Claims, 3 Drawing Sheets

(56) References Cited

U.S. PATENT DOCUMENTS

| | | | |
|---|---|---|---|
| 8,848,905 B1* | 9/2014 | Hamlet | H04L 9/0866 380/35 |
| 9,208,018 B1* | 12/2015 | Northcott | G06F 11/1008 |
| 9,306,666 B1* | 4/2016 | Zhang | H04B 10/11 |
| 9,613,714 B1* | 4/2017 | Wong | G11C 17/18 |
| 9,633,180 B2* | 4/2017 | Stewart | H04N 19/103 |
| 9,640,278 B1* | 5/2017 | Xi | G11C 11/4076 |
| 9,660,802 B1* | 5/2017 | McKinley | H04L 9/065 |
| 9,805,825 B1* | 10/2017 | Singh | G11C 29/12 |
| 10,311,930 B1* | 6/2019 | Kim | G11C 11/161 |
| 10,332,840 B2* | 6/2019 | Tseng | G11C 17/16 |
| 10,521,618 B1* | 12/2019 | Zhang | G06F 21/76 |
| 2003/0018932 A1* | 1/2003 | Blum | G06F 11/273 714/46 |
| 2005/0105331 A1* | 5/2005 | Lee | G11C 16/22 365/185.11 |
| 2006/0020746 A1* | 1/2006 | Brownhill | G06F 12/1425 711/103 |
| 2006/0044893 A1* | 3/2006 | Louie | G11C 16/22 365/195 |
| 2006/0174056 A1* | 8/2006 | Lambert | G06F 21/79 711/103 |
| 2006/0262626 A1* | 11/2006 | Lin | G11C 16/105 365/225.7 |
| 2007/0016964 A1* | 1/2007 | Halcrow | G06F 21/78 726/34 |
| 2007/0174513 A1* | 7/2007 | Wrigley | G06F 5/14 710/52 |
| 2007/0247905 A1* | 10/2007 | Rudelic | G11C 16/22 365/185.04 |
| 2008/0028474 A1 | 1/2008 | Horne et al. | |
| 2008/0189772 A1* | 8/2008 | Sims | G06F 21/445 726/5 |
| 2008/0232151 A1* | 9/2008 | Ahmed | G11C 17/18 365/96 |
| 2009/0091351 A1* | 4/2009 | Bueti | H01L 23/544 326/101 |
| 2009/0113155 A1* | 4/2009 | Beals | G06F 12/1466 711/164 |
| 2009/0141573 A1* | 6/2009 | Hsueh | G11C 29/08 365/201 |
| 2009/0180307 A1* | 7/2009 | Kurjanowicz | G11C 17/10 365/96 |
| 2009/0204823 A1* | 8/2009 | Giordano | G06F 11/3656 713/190 |
| 2011/0222330 A1* | 9/2011 | Lee | G11C 17/18 365/100 |
| 2011/0252189 A1* | 10/2011 | Kang | G11C 29/42 711/103 |
| 2011/0296119 A1* | 12/2011 | Zhao | G06F 3/0656 711/154 |
| 2012/0206971 A1* | 8/2012 | Chi | G11C 17/08 365/185.18 |
| 2012/0216096 A1* | 8/2012 | Seo | H03M 13/2906 714/763 |
| 2012/0304037 A1* | 11/2012 | Reddy | G06F 11/1012 714/763 |
| 2013/0061115 A1* | 3/2013 | Imai | H03M 13/618 714/763 |
| 2013/0173469 A1* | 7/2013 | Goebel | G06Q 30/0621 705/44 |
| 2013/0246891 A1* | 9/2013 | Manning | G11C 29/52 714/773 |
| 2014/0108786 A1* | 4/2014 | Kreft | H04L 9/30 713/156 |
| 2014/0244949 A1* | 8/2014 | Abali | G06F 3/065 711/162 |
| 2014/0281319 A1* | 9/2014 | Gupta | G06F 12/1458 711/163 |
| 2014/0281686 A1* | 9/2014 | Ware | G06F 11/1048 714/6.12 |
| 2014/0372671 A1* | 12/2014 | Tanamoto | G11C 13/0035 711/103 |
| 2015/0009743 A1* | 1/2015 | Chung | G11C 17/16 365/96 |
| 2015/0055417 A1* | 2/2015 | Kim | G11C 16/10 365/185.19 |
| 2015/0154421 A1* | 6/2015 | Feng | G06F 7/588 726/34 |
| 2015/0162100 A1* | 6/2015 | Motwani | G11C 29/82 714/719 |
| 2015/0169247 A1* | 6/2015 | Wang | G06F 7/582 711/103 |
| 2015/0293748 A1* | 10/2015 | Falk | H04L 9/3234 713/193 |
| 2015/0382189 A1* | 12/2015 | Zhang | H04W 12/0431 380/285 |
| 2016/0028544 A1* | 1/2016 | Hyde | G06F 3/0637 380/44 |
| 2016/0078251 A1* | 3/2016 | Soja | G06F 21/72 713/193 |
| 2016/0085961 A1* | 3/2016 | Tanamoto | G06F 21/44 726/19 |
| 2016/0110249 A1* | 4/2016 | Orme | G06F 11/1016 714/6.24 |
| 2016/0124873 A1* | 5/2016 | Xu | G06F 3/0611 711/105 |
| 2016/0179431 A1* | 6/2016 | Chen | G06F 3/0622 711/103 |
| 2016/0188244 A1* | 6/2016 | Yang | G06F 3/0644 711/163 |
| 2016/0330023 A1* | 11/2016 | Tanamoto | H04L 9/0861 |
| 2017/0005811 A1* | 1/2017 | Tremlet | H04L 63/0823 |
| 2017/0090788 A1* | 3/2017 | Shlick | G11C 29/808 |
| 2017/0228164 A1* | 8/2017 | Jayasena | G06F 12/0802 |
| 2017/0269904 A1* | 9/2017 | Takaya | G06F 7/588 |
| 2017/0344407 A1* | 11/2017 | Jeon | H04L 9/3297 |
| 2018/0095985 A1* | 4/2018 | Zhang | G06F 21/80 |
| 2018/0184290 A1* | 6/2018 | Luo | H04W 12/0431 |
| 2018/0234258 A1* | 8/2018 | Peffers | G06F 1/04 |
| 2018/0277198 A1* | 9/2018 | Tseng | G11C 7/1006 |
| 2019/0006017 A1* | 1/2019 | Reinman | G11C 16/26 |
| 2019/0036706 A1* | 1/2019 | Detert | G06F 21/73 |
| 2019/0130103 A1* | 5/2019 | Shen | G06F 21/00 |
| 2019/0147967 A1* | 5/2019 | Tuyls | H04L 9/3239 365/96 |
| 2019/0171391 A1* | 6/2019 | Dubeyko | G06F 3/0619 |
| 2019/0236281 A1* | 8/2019 | Hershman | G06F 13/362 |
| 2019/0268145 A1* | 8/2019 | Barth | H04L 9/3247 |
| 2019/0347445 A1* | 11/2019 | Chen | H04L 9/3278 |
| 2019/0347446 A1* | 11/2019 | Chen | G06F 21/76 |

FOREIGN PATENT DOCUMENTS

| | | |
|---|---|---|
| CN | 101859350 A | 10/2010 |
| CN | 102436423 A | 5/2012 |
| CN | 103229451 A | 7/2013 |
| CN | 103984886 A | 8/2014 |

* cited by examiner

CHIP FINGERPRINT MANAGEMENT BASED UPON ONE-TIME PROGRAMMABLE MEMORY

CROSS REFERENCE TO RELATED APPLICATIONS

The present application is based upon and claims the benefits of a priority of Chinese Patent Application No. 201810456424.7, filed on May 14, 2018, the entire contents of which are incorporated herein by reference.

TECHNICAL FIELD

The present disclosure relates to the technical field of data security, and in particular to a chip fingerprint management device and a security chip.

BACKGROUND

With the wide application of Internet of Things (IoT) devices and various embedded systems such as solid-state disks, security challenges brought therefrom have drawn an increasing attention. These security challenges mainly concern privacy protection and data security. In order to effectively protect privacy and prevent any cloning or counterfeiting, it is necessary to use a chip fingerprint. The chip fingerprint is similar to human fingerprint, being able to distinguish any two chips from each other so as to prevent cloning attacks. The various authentication and encryption schemes need the participation of chip fingerprint.

Commonly, the chip fingerprint adopts SRAM-based PUF scheme (Physical Unclonable Functions based on Static Random-Access Memory). One of the disadvantages for that scheme is that the optimal size for SRAM modules in the chip are varied for the different generations of IC manufacturing process or even different factories or lots. Since the size (bit-cell number) for the SRAM module is difficult to estimate, we have to introduce a large number of redundant units for the consideration of design margin, which results in the waste of chip areas. Another concern is that patterns of readout value from SRAM will be influenced by external factors and change with the aging of chip. Thus, complicated error correction codes (ECC) circuit and sophisticated SRAM read-out circuits are needed to reliably generate the chip fingerprint under all possible working conditions for the entire lifespan (up to 10 years). Last but not least, strict testing and screening procedures should be performed at the final stage of chip manufacturing or just before the chip to be delivered, so as to screen out chips that cannot generate chip fingerprint stably. Therefore, the existing scheme for chip fingerprint has significant uncertainty and uncontrollability, incurring considerable waste on chip area, and increasing costs of designing, production, and testing of the chip.

SUMMARY

In one aspect, in general, the present disclosure describes the scheme for a chip fingerprint management device and a security chip which would alleviate at least one deficiency mentioned above.

In another aspect, in general, the present disclosure describes a chip fingerprint management device, comprising: a one-time programmable (OTP) memory comprising a first storage region, the first storage region being readable by hardware and access restricted by software; and an OTP controller configured to generate a chip fingerprint based on a random number, and program the generated chip fingerprint into the first storage region in the OTP memory.

In yet another aspect, in general, the present disclosure describes a security chip comprising the above chip fingerprint management device.

This scheme may have one or more following advantages. The OTP controller programs the chip fingerprint into the first storage region which is readable by hardware and access restricted by software, after generating the chip fingerprint based on the random number. The mechanism of chip fingerprint generation is straightforward, thus reducing the complexity and cost of chip design and also improving the design reusability. The access model for first storage region storing the chip fingerprint prevents the chip fingerprint from leaking or being tampered, fully strengthening the security and the reliability of the chip fingerprint. The corresponding operation flow makes the management of chip fingerprint flexible and robust.

Additional features and aspects of the present disclosure will be apparent from the following description of exemplary embodiments with reference to the attached drawings.

BRIEF DESCRIPTION OF THE DRAWINGS

The drawings, which are incorporated in and constitute a part of the specification, together with the description, illustrate exemplary embodiments, features and aspects of the present disclosure and serve to explain the principles of the present disclosure.

DETAILED DESCRIPTION OF EMBODIMENTS

Various exemplary embodiments, features and aspects of the present disclosure will be described in detail with reference to the drawings. Like reference numerals in the drawings represent elements having the same or similar functions. Although various aspects of examples are shown in the drawings, it is unnecessary to have the drawings rendered in proportion unless otherwise specified.

Herein the term "exemplary" means "used as an instance or embodiment, or explanatory". Any embodiment described as "exemplary" here is not necessarily construed as being superior to or better than other embodiments.

Additionally, numerous details are given in the following embodiments for the purpose of better explanation on the present disclosure. One skilled in the art may understand that the present disclosure can still be realized even without some of those details. Methods, means, elements and circuits that are well known to a person skilled in the art are not described in detail so that the principle of the present disclosure becomes apparent.

Figure 1:
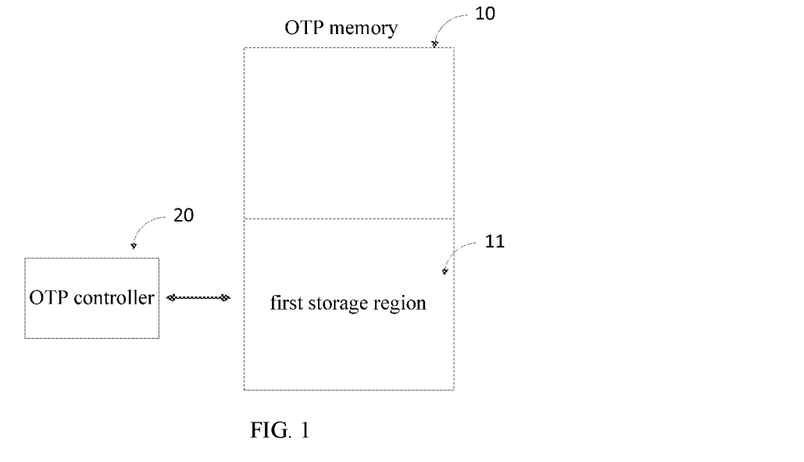
FIG. 1 shows a block diagram of a chip fingerprint management device according to an exemplary embodiment of the present disclosure.

FIG. 1 shows a block diagram of a chip fingerprint management device according to an embodiment of the present disclosure. As shown in FIG. 1, the chip fingerprint management device comprises: a one-time programmable (OTP) memory 10 comprising a first storage region 11, the first storage region 11 being readable by hardware and access restricted by software; and an OTP controller 20 configured to generate a chip fingerprint based on a random number, and program the generated chip fingerprint into the first storage region 11 in the OTP memory 10.

In an embodiment, the first storage region 11, which is readable by hardware and access restricted by software, can be divided in the OTP memory 10 for storing the chip fingerprint. For example, the OTP controller 20 may define the region addressed at 00x0-0xBF in the OTP memory 10 as the first storage region 11.

The OTP controller 20 should modify the access model of the OTP memory 10 accordingly to restrict the access by software to the first storage region 11. In an embodiment, the first storage region 11 is unwritable by software, and when accessed by software read operation it would not return stored data. In a further embodiment, when accessed by software read operation, the first storage region 11 could return a value indicating whether the first storage region 11 has been written or not. For example, if the first storage region 11 has been written, when accessed by software read operation, the first storage region 11 could return a value of all 0s. If the first storage region 11 has not been written, when accessed by software read operation, the first storage region 11 could return a value of all 1s. The software is allowed to determine whether the chip fingerprint already exists, without exposing the specific value of the chip fingerprint, thereby protecting the confidentiality of the chip fingerprint.

The first storage region 11 may support hardware WO/RM (write once/read many). In an embodiment, the OTP controller 20 can program the first storage region 11 only once, and read the first storage region 11 multiple times. The first storage region 11 may interact with an external device via a hardware interface of the OTP memory 10. In an embodiment, the OTP controller 20 reads the chip fingerprint from random number generator and writes the chip fingerprint into the first storage region 11 through the hardware interface of the OTP memory 10.

The OTP controller 20 may read the random number from the outside during the generation of the chip fingerprint. For example, when the manufacturing process or delivery stage of the chip is performed in a safe and controllable environment, the random number may be generated by a true random number generator external to the chip, and imported into the OTP controller 20 via a test interface. For this scheme, there is no true random number generator inside the chip, thus reducing the cost.

The OTP controller 20 may generate the chip fingerprint based on the random number in accordance with a predefined chip fingerprint generation rule. For example, the OTP controller 20 may generate the chip fingerprint based on the random number in accordance with the required security level or a set of security criteria. The OTP controller 20 may also generate the chip fingerprint directly based on the random number. For example, if the size of the chip fingerprint is 256 bits (32 bytes), then the OTP controller 20 collects random number bits continuously until reaching a full 256-bit length, and then generates the chip fingerprint. This disclosure does not intend to limit the way of chip fingerprint generation.

In the embodiment, the OTP controller programs the generated chip fingerprint into the first storage region which is readable by hardware and access restricted by software, after generating the chip fingerprint based on the random number. The mechanism of generating chip fingerprint is straightforward, thus reducing the complexity and the cost of chip design and also improving the design reusability. The first storage region storing the chip fingerprint prevents the chip fingerprint from leaking or being tampered, fully strengthening the security and the reliability of the chip fingerprint. The corresponding operation flow makes the management of chip fingerprint flexible and robust.

In an embodiment, the OTP controller 20 is configured to determine whether a value of the random number is all 0s or all 1s; and generate the chip fingerprint based on the random number in a case where the value of the random number is neither all 0s nor all 1s. If the value of random number is all 0s or all 1s, it's not qualified as a valid candidate for the chip fingerprint and should be discarded.

In an embodiment, during the generation procedure of the chip fingerprint, the OTP controller 20 may firstly determine whether the value of the random number is all 0s or all 1s. The chip fingerprint generated based on the random value of all 0s or all 1s is a weak fingerprint which does not meet the security requirement of chip fingerprint. Moreover, all 0s or all 1s has special meanings in the flow of chip fingerprint generation and chip fingerprint reading; e.g., to determine whether the first storage region has been programmed before or not. Therefore, all 0s or all 1s is invalid as the value of chip fingerprint. The OTP controller 20 may discard the random number of all 0s or all 1s, and regenerate a new random number and determine whether it can be qualified as a valid chip fingerprint or not.

In the embodiment, the OTP controller 20 generates chip fingerprint only based on the random number that is neither all 0s nor all 1s. Deleting two possible values from the entire chip fingerprint space ($2^{256}$) has no impact on the security of the chip fingerprint.

In an embodiment, during the generation of the chip fingerprint, at the first step the OTP controller 20 may read the value of the first storage region 11 and determine whether the first storage region 11 has been programmed with chip fingerprint before or not. For example, when the first storage region 11 is not written with chip fingerprint (unprogrammed state), the value of the first storage region 11 is all is (i.e. here we assume that the unwritten state value of the first storage region 11 is all 1s). When the read value of the first storage region 11 is all 1s, it is determined that the first storage region 11 has not been written with chip fingerprint. At this time, the OTP controller 20 may generate the chip fingerprint based on the random number and program the generated chip fingerprint into the first storage region 11. When the read value of the first storage region 11 is not all 1s, it is determined that the first storage region 11 has been written with chip fingerprint, and the OTP controller 20 may abort the generation procedure of chip fingerprint. By this way, it is guaranteed that the first storage region 11 will not be written with chip fingerprint twice.

In the embodiment, before generating the chip fingerprint, the OTP controller 20 determines whether the first storage region 11 has been written with the chip fingerprint or not in accordance with the read value and the unwritten state value of the first storage region 11, and in a case where the first storage region 11 has not been written, generates the chip fingerprint based on the random number, and programs the generated chip fingerprint into the first storage region 11.

Figure 2:
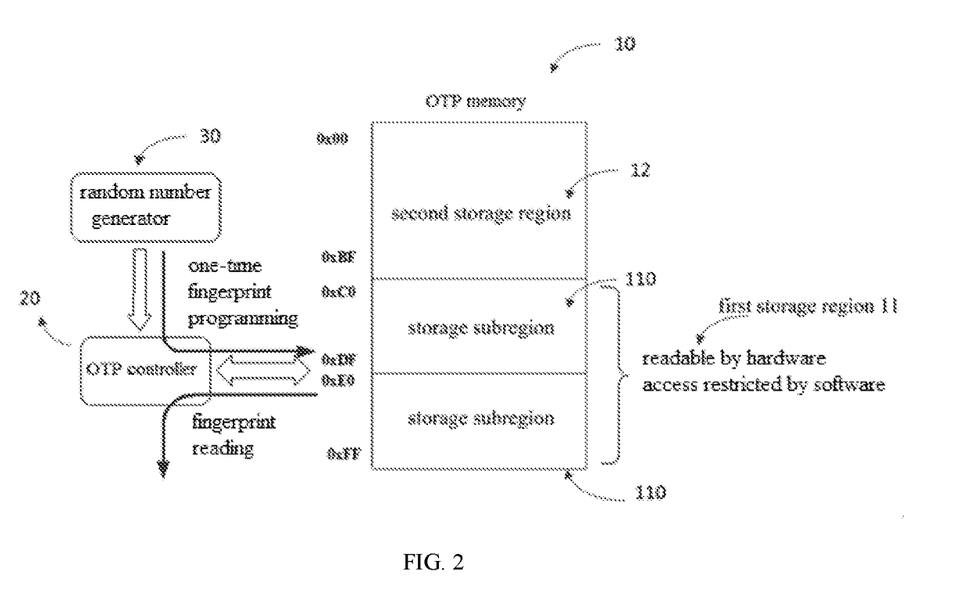
FIG. 2 shows a block diagram of a chip fingerprint management device according to another exemplary embodiment of the present disclosure.

FIG. 2 shows a block diagram of a chip fingerprint management device according to another embodiment of the present disclosure. As shown in FIG. 2, the first storage region 11 comprises two or more subregions 110, each of which is configured to store one chip fingerprint. The OTP controller 20 is configured to: specify a storage subregion 110; determine whether the specified storage subregion 110 has been written with the chip fingerprint according to the read value and the unwritten state value of the storage subregion 110; and generate the chip fingerprint based on the random number in a case where the storage subregion 110 has not been written with the chip fingerprint, and program the generated chip fingerprint into the storage subregion 110.

In an embodiment, the first storage region 11 may be divided into a plurality of storage subregions 110. The number of storage subregions 110 may be set according to requirements. The size of each storage subregion 110 may be the same or different. For example, the first storage region 11 may be divided into two storage subregions 110: a storage subregion 110 addressed at 0xE0-0xFF and a storage subregion 110 addressed at 0xC0-0xDF.

During the generation of chip fingerprint, the OTP controller 20 may select the storage subregion 110 according to the software setting. After having the chip fingerprint generated, the OTP controller 20 programs the generated chip fingerprint into the selected storage subregion 110.

In an embodiment, during the generation of the chip fingerprint, after the OTP controller 20 specifies a storage subregion 110 for storing the chip fingerprint and before the OTP controller 20 generates the chip fingerprint based on the random number, the value of the specified storage subregion 110 can be read by hardware, and the read value can be compared with the unwritten state value when the storage subregion 110 is not written with the chip fingerprint, to determine whether the storage subregion 110 has been written with the chip fingerprint. When the OTP controller 20 determines that the storage subregion 110 has not been programmed before, the chip fingerprint can be generated based on the random number, and the generated chip fingerprint is programmed into the storage subregion 110. When the OTP controller 20 determines that the storage subregion 110 has been written with the chip fingerprint, it may specify another storage subregion 110 to continue the operation of chip fingerprint generation.

In the embodiment, by dividing the first storage region into a plurality of storage subregions, the generated chip fingerprint is stored in the corresponding storage subregion during the generation of the chip fingerprint. It is possible to increase the number of stored chip fingerprints in the chip, then the chip may use distinct chip fingerprint for different applications. Thus, each application with distinct chip fingerprint is isolated from each other. Alternatively, different chip fingerprint may be used in different phases during the life cycle of the chip product, which greatly improves the usage flexibility and robustness of the chip fingerprint.

In an embodiment, the OTP controller 20 is configured to: after programming the generated chip fingerprint into the storage subregion 110, read the chip fingerprint; compare the read chip fingerprint with the generated chip fingerprint just programmed; and determine that the chip fingerprint generation fails in a case where the read chip fingerprint is inconsistent with the generated chip fingerprint.

In the embodiment, after the OTP controller 20 programs the generated chip fingerprint into the storage subregion 110, the OTP controller 20 can read the chip fingerprint programmed into the storage subregion 110 immediately. The OTP controller 20 may compare the read chip fingerprint with the generated chip fingerprint just programmed. When the comparison results in consistence, the OTP controller 20 may determine that the chip fingerprint has been written in the storage subregion 110 correctly, and the fingerprint generation operation is finished successfully. When the comparison results in inconsistence, the OTP controller 20 may determine that the chip fingerprint has not been written correctly. In this case, the OTP controller 20 should abort the chip fingerprint generation process, and notify the upper software layer of the fingerprint generation failure. The OTP controller 20 may prompt the user to or automatically specify another storage subregion for the chip fingerprint generation operation.

In the embodiment, the OTP controller may read chip fingerprint just programmed immediately and compare the read chip fingerprint with the generated chip fingerprint. When the comparison results in inconsistence, the OTP controller 20 determines that the chip fingerprint has not been written correctly, and aborts the chip fingerprint generation process. By comparing the written chip fingerprint with the generated chip fingerprint, it is possible to guarantee that the chip fingerprint is written correctly.

In an embodiment, the OTP controller 20 is configured to: specify a storage subregion 110 to read the chip fingerprint; determine whether the specified storage subregion 110 has been written with the chip fingerprint according to an unwritten state value and a read value of the storage subregion 110; and abort the reading of the chip fingerprint in a case where the storage subregion 110 has not been written with the chip fingerprint.

In an embodiment, the OTP controller 20 may read the value of the storage subregion 110 during the reading of the chip fingerprint and compare the read value with the unwritten state value when the storage subregion 110 is not written with the chip fingerprint, to determine whether the storage subregion 110 has been written with the chip fingerprint. When the storage subregion 110 has not been programmed before (for example, return all 1s), it is determined that the chip fingerprint is not stored in the storage subregion 110. The OTP controller 20 may abort the reading of the chip fingerprint, and prompt the user to perform the generation of the chip fingerprint beforehand. When the storage subregion 110 has been written with the chip fingerprint, the OTP controller 20 will go on with the reading operation of the chip fingerprint.

In this embodiment, during the reading of the chip fingerprint, the OTP controller firstly determines whether the storage subregion has been written with the chip fingerprint by comparing the read value and the unwritten state value of the storage subregion. When the storage subregion has not been written with the chip fingerprint, the reading operation of the chip fingerprint is aborted. By determining whether the storage subregion has been written with the chip fingerprint, we achieve the goals of both retrieving chip fingerprint and checking its validity.

In an embodiment, the OTP controller 20 is configured to: read the chip fingerprint in the first storage region 11 multiple times; determine whether the read chip fingerprint is consistent for consecutive read operations; and determine that the reading of the chip fingerprints fails in a case where consecutive read operations return inconsistent chip fingerprint values.

In an embodiment, the first storage region 11 may be read multiple times. The OTP controller 20 may check whether the multiple copies of chip fingerprint are all identical or not. When the comparison results in inconsistence, the OTP controller 20 determines that the chip fingerprint reading fails. The OTP controller 20 may prompt the user to abandon current unstable storage subregion 110 and specify another storage subregion 110 for chip fingerprint operation.

In the embodiment, the OTP controller determines whether the reading of chip fingerprint succeeds by determining whether the read chip fingerprint is consistent for consecutive read operations, thereby guaranteeing the correctness of the read chip fingerprint.

In an embodiment, the OTP controller 20 is configured to: determine whether a value of the read chip fingerprint is all 0s or all 1s; and determine that the reading of the chip fingerprints fails in a case where the value of the read chip fingerprint is all 0s or all 1s.

In the embodiment, the chip fingerprint of all 0s or all 1s is invalid. When the value of the read chip fingerprint is all 0s or all 1s, the OTP controller 20 may determine that the chip fingerprint reading fails. The OTP controller 20 may prompt the user to or automatically specify correct storage subregion 110 to continue the chip fingerprint reading. That storage subregion 110 should have been programmed with valid chip fingerprint beforehand.

In the embodiment, after the OTP controller reads the chip fingerprint in the first storage region, it is determined whether the read chip fingerprint is valid by checking if the value of the chip fingerprint is neither all 0s nor all 1s, thereby guaranteeing the validity of the read chip fingerprint.

In an embodiment, the device further comprises a random number generator 30 configured to generate the random number and provide the generated random number to the OTP controller 20.

In the embodiment, the OTP controller 20 may generate the chip fingerprint based on the random number generated by the random number generator 30 provided on the chip. Typically a TRNG (True Random Number Generator) is generally contained in System-On-Chip (Soc); by leveraging existing TRNG on chip, the design complexity and cost of the chip can be reduced.

In an embodiment, the OTP memory 10 further comprises a second storage region 12. The second storage region 12 is readable by software and is configured to store public information of the chip.

For example, the region in the OTP memory 10 addressed at 0x00 to 0xBF is the second storage region 12, which is readable and writable by software. The second storage region 12 may be configured to store public information such as serial number as conventional OTP memory does.

Another aspect of the present disclosure describes a security chip, comprising the chip fingerprint management device according to any of the above embodiments. In an embodiment, the security chip may comprise the OTP memory 10, the OTP controller 20 and the random number generator 30. Compared with SRAM-Based PUF chip fingerprint scheme, the security chip provided in the embodiments of the present disclosure does not rely on uncontrollable factors introduced by manufacturing process to provide entropy source of the chip fingerprint, and does not need a large number of redundant units and complex error correcting code circuits (ECC circuits), thereby reducing the cost of designing, producing, and testing for the security chip.

In an embodiment, the working states of the security chip in the embodiments of the present disclosure may comprise a chip fingerprint generation process and a chip fingerprint reading process. The OTP memory in the security chip may comprise multiple storage subregions. Each storage subregion stores one chip fingerprint, and for each storage subregion, the chip fingerprint generation process can be performed only once. After the chip fingerprint generation process succeeds, the chip fingerprint reading process can be performed for unlimited times.

Figure 3:
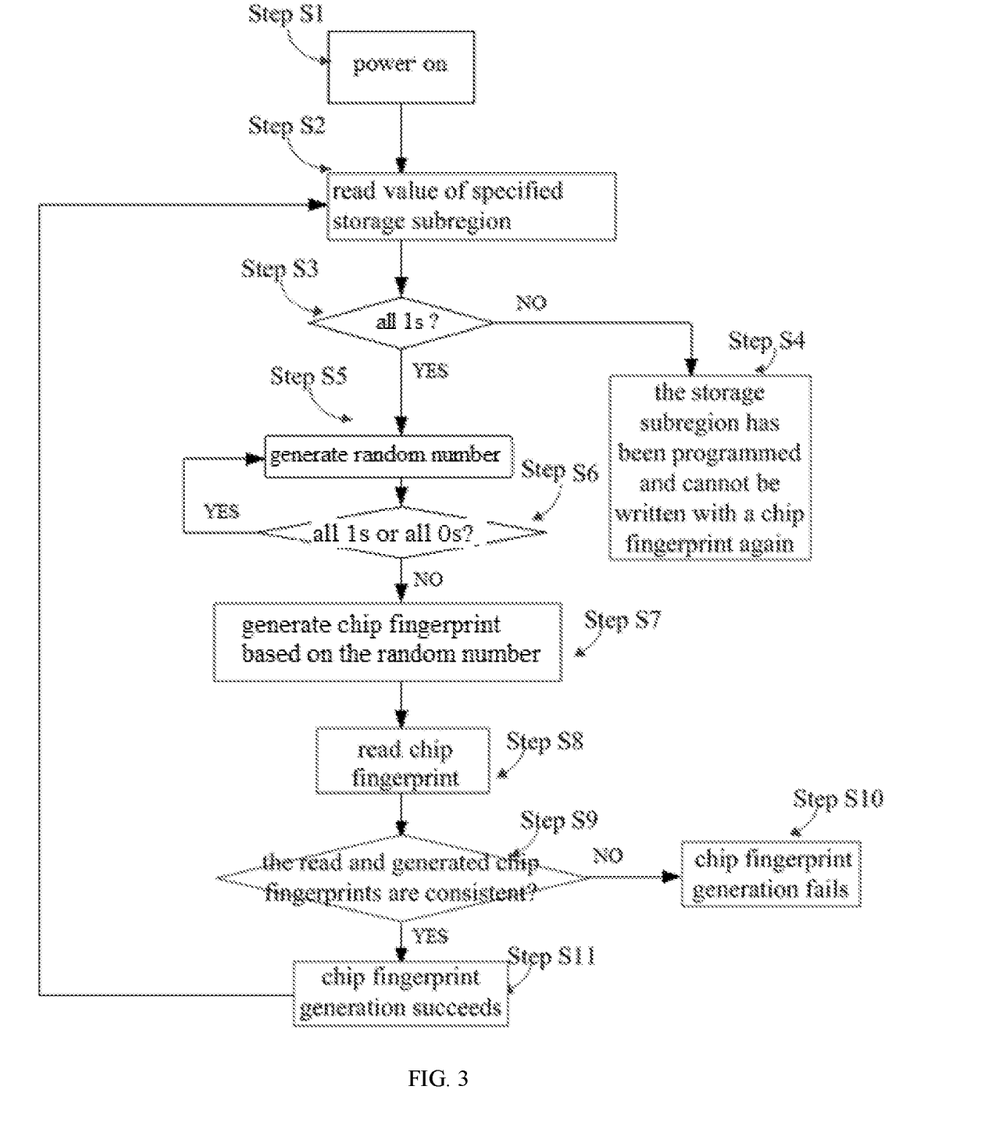
FIG. 3 shows a flowchart of generating the chip fingerprint by the chip fingerprint management device according to an exemplary embodiment of the present disclosure.

FIG. 3 shows a flowchart for chip fingerprint generation process by the chip fingerprint management device according to an embodiment of the present disclosure. The chip fingerprint management device provided by the embodiments of the present disclosure may comprise an OTP memory, an OTP controller, and a random number generator. The OTP memory comprises a first storage region, which is readable by hardware and access restricted by software. The OTP controller can program the chip fingerprint into the first storage region once, and read the chip fingerprint stored in the first storage region multiple times. The first storage region comprises a plurality of storage subregions, each of which can store one chip fingerprint and can only be written once. In this document, it is assumed that the unprogrammed (unwritten) state value of the first storage region in the OTP memory is all 1s.

As shown in FIG. 3, the steps of the chip fingerprint management device generating the chip fingerprint comprise:

Step S1 of powering on the chip where the chip fingerprint management device according to the embodiments of the present disclosure is located;

Step S2 of reading the value of a specified storage subregion in the first storage region by the OTP controller;

Step S3 of determining whether the read value is all is by the OTP controller; if not, proceeding to Step S4, and otherwise, proceeding to Step S5;

Step S4 of indicating that the storage subregion has been programmed and cannot be written with a chip fingerprint again;

Step S5 of indicating that the storage subregion has not been programmed, and the random number generator generating the random number;

Step S6 of determining whether the generated random number is all is or all 0s by the OTP controller; if yes, the random number does not meet the requirement, and returning to Step S5 to regenerate a new random number; if not, the random number meets the requirement, and proceeding to Step S7;

Step S7 of generating, by the OTP controller, chip fingerprint based on the random number and programming the fingerprint into the first storage region in the OTP memory;

Step S8 of reading the chip fingerprint programmed into the first storage region by the OTP controller;

Step S9 of determining whether the read chip fingerprint is consistent with the chip fingerprint just generated and programmed by the OTP controller; if not, proceeding to Step S10, and otherwise, proceeding to Step S11;

Step S10 of determining that the chip fingerprint generation fails; and

Step S11 of determining that the chip fingerprint generation succeeds.

Figure 4:
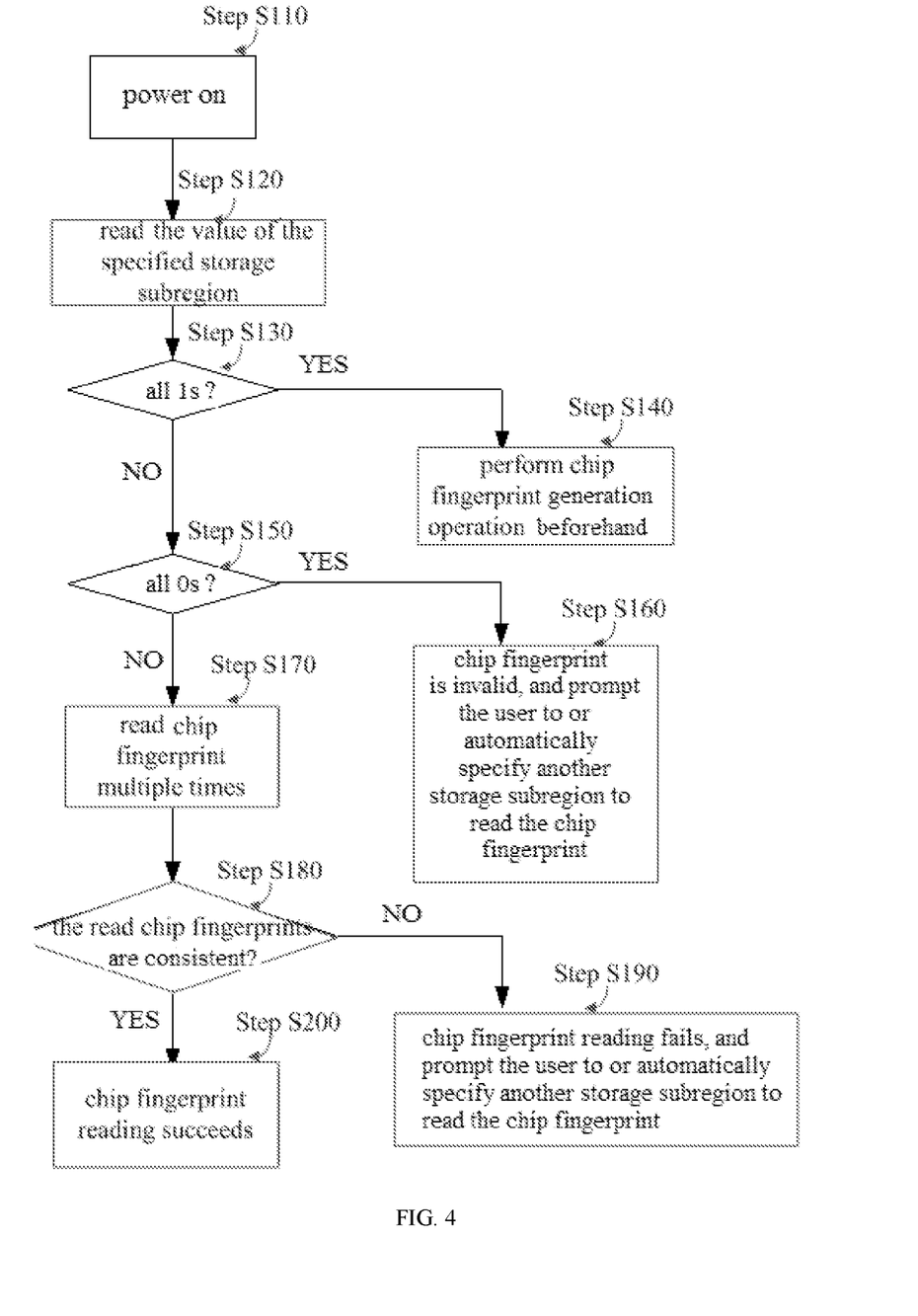
FIG. 4 shows a flowchart of reading the chip fingerprint by the chip fingerprint management device according to an exemplary embodiment of the present disclosure.

FIG. 4 shows a flowchart of reading chip fingerprint by the chip fingerprint management device according to an embodiment of the present disclosure. As shown in FIG. 4, the steps of the chip fingerprint management device reading chip fingerprint comprise:

Step S110 of powering on the chip where the chip fingerprint management device according to the embodiments of the present disclosure is located;

Step S120 of reading the value of the specified storage subregion;

Step S130 of determining whether the read value of the storage subregion is all 1s; if yes, proceeding to Step S140, and otherwise, proceeding to Step S150;

Step S140 of indicating that the storage subregion has not been written with the chip fingerprint, and the chip fingerprint generation operation should be performed beforehand;

Step S150 of indicating that the storage subregion has been written with the chip fingerprint; reading the chip fingerprint, and determining whether the read chip fingerprint is all 0s; if yes, proceeding to Step S160, and otherwise, proceeding to Step S170;

Step S160 of indicating that the read chip fingerprint is an invalid chip fingerprint, and prompting the user to specify or automatically specifying another storage subregion to read the chip fingerprint;

Step S170 of reading the chip fingerprint multiple times and proceeding to Step S180;

Step S180 of determining whether the chip fingerprints read multiple times are all identical; if not, proceeding to Step 190; if yes, proceeding to Step S200;

Step S190 of determining that the chip fingerprint reading fails, and prompting the user to specify or automatically specifying another storage subregion to read the chip fingerprint; and Step S200 of determining that the chip fingerprint reading succeeds.

The descriptions of the various examples have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical applications or technical improvements over technologies found in the marketplace, or to enable others of ordinary skill in the art to understand the examples disclosed herein.

What is claimed is:

1. A chip fingerprint management device, comprising:
   a one-time programmable (OTP) memory comprising a first storage region, the first storage region being readable by hardware and access restricted by software; and
   an OTP controller configured to:
      generate a random number;
      generate a chip fingerprint based on the random number;
      determine whether the random number is valid for the chip fingerprint;
      generate an error when the random number is not valid for the chip fingerprint;
      program the generated chip fingerprint into the first storage region in the OTP memory when the random number is determined valid for the chip fingerprint;
      compare the chip fingerprint to one or more copies of the chip fingerprint when the one or more copies are stored in the OTP memory; and
      determine a chip fingerprint read fails when the comparison of the chip fingerprint to the one or more copies of the chip fingerprint fails.

2. The chip fingerprint management device according to claim 1, wherein the first storage region is unwritable by software, and configured to not return stored data directly when accessed by software read operation.

3. The chip fingerprint management device according to claim 2, wherein the first storage region is further configured to, when accessed by software read operation, return a value indicating whether the first storage region has been written or not.

4. The chip fingerprint management device according to claim 1, wherein the OTP controller to determine whether the random number is valid for the chip fingerprint is further to:
   determine whether the value of the random number is all 0s or all 1s; and
   generate the chip fingerprint based on the random number in a case where the value of the random number is neither all 0s nor all 1s.

5. The chip fingerprint management device according to claim 1, wherein the first storage region comprises a plurality of storage subregions, each of which is configured to store one chip fingerprint, and the OTP controller is further configured to:
   specify a storage subregion;
   determine whether the specified storage subregion has been written or not according to an unwritten state value and a read value of the storage subregion; and
   in a case where the storage subregion has not been written, generate the chip fingerprint based on the random number, and program the generated chip fingerprint into the storage subregion.

6. The chip fingerprint management device according to claim 5, wherein the OTP controller is further configured to:
   after programing the generated chip fingerprint into the storage subregion, read the chip fingerprint;
   compare the read chip fingerprint with the generated chip fingerprint just programmed; and
   determine that the chip fingerprint generation fails in a case where the read chip fingerprint is inconsistent with the generated chip fingerprint.

7. The chip fingerprint management device according to claim 1, wherein the first storage region comprises a plurality of storage subregions, each of which is configured to store one chip fingerprint, and the OTP controller is further configured to:
   specify a storage subregion to read the chip fingerprint;
   determine whether the specified storage subregion has been written with the chip fingerprint according to an unwritten state value and a read value of the storage subregion; and
   abort the reading of the chip fingerprint in a case where the storage subregion has not been written with the chip fingerprint.

8. The chip fingerprint management device according to claim 1, wherein the OTP controller is further configured to:
   read the chip fingerprint in the first storage region multiple times;
   determine whether the read chip fingerprint is consistent for consecutive read operations; and
   determine that the reading of the chip fingerprint fails in a case where consecutive read operations return inconsistent chip fingerprint values.

9. The chip fingerprint management device according to claim 1, wherein the OTP controller is further configured to:
   determine whether a value of the read chip fingerprint is all 0s or all 1s; and
   determine that the reading of the chip fingerprint fails in a case where the value of the read chip fingerprint is all 0s or all 1s.

10. The chip fingerprint management device according to claim 1, further comprising a random number generator configured to generate the random number and output the generated random number to the OTP controller.

11. The chip fingerprint management device according to claim 1, wherein the OTP memory further comprises a second storage region, the second storage region being readable by software and configured to store public information of the chip.

12. The chip fingerprint management device according to claim 1, wherein the OTP controller is configured to read the chip fingerprint from and program the chip fingerprint into the first storage region through a hardware interface of the OTP memory.

13. The chip fingerprint management device according to claim 1, wherein the OTP controller is configured to abandon the first storage subregion and to select a second storage subregion to program the generated chip fingerprint into the OTP memory.

* * * * *